(12) United States Patent
Gandikota et al.

(10) Patent No.: US 10,778,322 B2
(45) Date of Patent: Sep. 15, 2020

(54) METHODS AND SYSTEMS FOR DYNAMICALLY CONFIGURING MODE OF OPERATION FOR A PROSE ENABLED USER EQUIPMENT

(71) Applicant: SAMSUNG ELECTRONICS CO., LTD., Suwon-si (KR)

(72) Inventors: Jagadeesh Gandikota, Bangalore (IN); Arijit Sen, Bangalore (IN); Yongsoo Kwon, Suwon-si (KR); Kyoochun Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/358,853

(22) Filed: Mar. 20, 2019

(65) Prior Publication Data

US 2019/0349069 A1 Nov. 14, 2019

(30) Foreign Application Priority Data

May 14, 2018 (IN) .............................. 201841018063
Sep. 25, 2018 (IN) ............................ 2018 41018063

(51) Int. Cl.
*H04B 7/14* (2006.01)
*H04W 4/40* (2018.01)
*H04W 48/16* (2009.01)
*H04W 24/10* (2009.01)
(Continued)

(52) U.S. Cl.
CPC ................ *H04B 7/14* (2013.01); *H04W 4/40* (2018.02); *H04W 24/10* (2013.01); *H04W 48/16* (2013.01); *H04W 84/042* (2013.01); *H04W 88/04* (2013.01)

(58) Field of Classification Search
CPC ..... H04W 88/04; H04W 8/005; H04W 76/14; H04W 48/16; H04W 84/042; H04W 24/10
See application file for complete search history.

(56) References Cited

U.S. PATENT DOCUMENTS

2014/0133332 A1   5/2014 Lee
2015/0215028 A1*  7/2015 Ljung .................. H04W 88/04
                                                  370/315
2016/0088668 A1   3/2016 Kim et al.
(Continued)

FOREIGN PATENT DOCUMENTS

WO    2017/015788 A1    2/2017

OTHER PUBLICATIONS

Interdigital Communications, "Functional Split between the AS and Higher Layers for D2D Discovery", Tdoc R2-133502, 3GPP TSG-RAN WG2 #83bis, Ljuljana, Slovenia, Oct. 7-11, 2013, pp. 1-5. (5 pages total).

(Continued)

*Primary Examiner* — Keith Ferguson
(74) *Attorney, Agent, or Firm* — Sughrue Mion, PLLC

(57) ABSTRACT

A method and relay user equipment are provided. The relay user equipment detects one or more other relay user equipment (UE) that is within a network area including the relay user equipment, that is in an announcing mode, and that is providing Proximity Service to one or more remote UEs that is outside the network area; and switches a mode of the relay user equipment from a monitoring mode to the announcing mode, or from the announcing mode to the monitoring mode, based the one or more other relay UE that is detected.

30 Claims, 13 Drawing Sheets

(51) Int. Cl.
      *H04W 88/04*        (2009.01)
      *H04W 84/04*        (2009.01)

(56)                References Cited

U.S. PATENT DOCUMENTS

2016/0204847 A1*   7/2016  Ryu ................. H04B 7/15507
                                                            455/7
2016/0302251 A1   10/2016  Chatterjee et al.
2018/0124674 A1    5/2018  Vutukuri et al.

OTHER PUBLICATIONS

International Search Report (PCT/ISA/210) dated Jul. 24, 2019 by the International Searching Authority in counterpart International Patent Application No. PCT/KR2019/004428.
Written Opinion (PCT/ISA/237) dated Jul. 24, 2019 by the International Searching Authority in counterpart International Patent Application No. PCT/KR2019/004428.

* cited by examiner

METHODS AND SYSTEMS FOR DYNAMICALLY CONFIGURING MODE OF OPERATION FOR A PROSE ENABLED USER EQUIPMENT

CROSS REFERENCE TO RELATED APPLICATION

This application is based on and claims priority under 35 U.S.C. § 119 to Indian Patent Provisional Application No. 201841018063 filed on May 14, 2018, in the Indian Patent Office, and to Indian Patent Complete Application No. 201841018063, filed on Sep. 25, 2018, in the Indian Patent Office, the disclosures of which are incorporated by reference herein in their entireties.

BACKGROUND

1. Field

The disclosure relates to communication systems, and more particularly to methods and systems for dynamically configuring the mode of operation for a Proximity Services (ProSe) enabled User Equipment (UE).

2. Description of Related Art

Currently, a range or coverage area of a network may be extended by providing Proximity Services (ProSe) to remote UEs, which are outside the coverage area of the network, through relay UEs. The UEs may be in an announcing mode or in a monitoring mode. Consider a first scenario in which a remote UE is out of a coverage area of a network. The remote UE may be in the announcing mode, wherein the remote UE may attempt to detect a relay UE, through which the remote UE may connect to the network. In this first scenario, the relay UE may be in the monitoring mode. In another second scenario, the relay UE may be in the announcing mode, wherein the relay UE announces its availability to provide ProSe based services. Herein, a remote UE, desiring to connect with the network, may access the network through the relay UE. In this second scenario, the remote UE may be considered to be in the monitoring mode.

The power consumption of the relay UEs may be relatively higher in the announcing mode compared to that in the monitoring mode. As such, if there are no remote UEs to provide ProSe, there is unnecessary power consumption by the relay UEs, if the relay UEs are in the announcing mode. Additionally, network resources used for providing ProSe may not be optimally utilized by the relay UEs. For example, in some cases, all relay UEs may announce their availability to provide ProSe at the same time, which may lead to interference.

SUMMARY

Provided are methods and systems for dynamically switching from announcing mode to monitoring mode and vice-versa, by a relay UE, while providing ProSe to a remote UE.

Additional aspects will be set forth in part in the description which follows and, in part, will be apparent from the description, or may be learned by practice of the presented embodiments.

In accordance with an aspect of the disclosure, there is provided a method comprising detecting, by a relay User Equipment (UE), presence of at least one other relay UE providing Proximity Service (ProSe) to at least one remote UE, wherein the relay UE is operating in one of an announcing mode and a monitoring mode and the at least one other relay UE is operating in the announcing mode; and switching, by the relay UE, modes, based on a number of the at least one other relay UE whose presence is detected, signal strengths of signals from the at least one other relay UE whose presence is detected, resource availability of the at least one other relay UE whose presence is detected, and/or a request from the at least one remote UE to render ProSe.

In accordance with an aspect of the disclosure, there is provided a relay user equipment comprising at least one microprocessor configured to detect a presence of at least one other relay user equipment (UE) providing Proximity Service (ProSe) to at least one remote UE, wherein the relay user equipment is operating in one of an announcing mode and a monitoring mode and the at least one other relay UE is operating in the announcing mode; and switch modes, based on a number of the at least one other relay UE whose presence is detected, signal strengths of signals from the at least one other relay UE whose presence is detected, resource availability of the at least one other relay UE whose presence is detected, and/or a request from the at least one remote UE to render ProSe.

In accordance with another aspect of the disclosure, there is provided a relay user equipment comprising at least one microprocessor configured to detect at least one other relay user equipment (UE) that is within a network area including the relay user equipment, that is in an announcing mode, and that is providing Proximity Service (ProSe) to at least one remote UE that is outside the network area; and switch a mode of the relay user equipment from a monitoring mode to the announcing mode, or from the announcing mode to the monitoring mode, based the at least one other relay UE that is detected.

BRIEF DESCRIPTION OF FIGURES

The above and other aspects, features, and advantages of certain embodiments of the present disclosure will be more apparent from the following description taken in conjunction with the accompanying drawings, in which.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein. Moreover, as used herein, the terms "1st" or "first" and "2nd" or "second" may use corresponding components regardless of importance or order and are used to distinguish one component from another without limiting the components.

Figure 1:
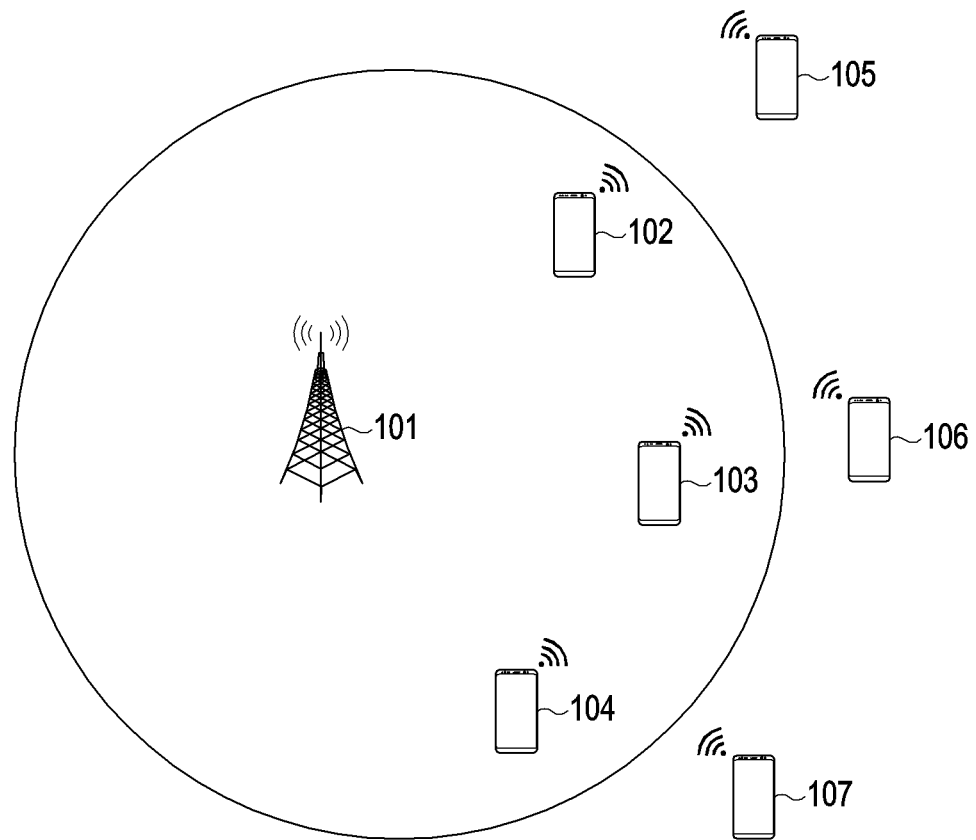
FIG. 1 depicts an example scenario, wherein multiple relay UEs announce their availability to render ProSe to remote UEs.

FIG. 1 depicts an example scenario, wherein multiple relay UEs (102-104) announce their availability to render Proximity Services (ProSe) to remote UEs (105-107). The relay UEs (102-104) may be in an announcing mode and may indicate their availability to provide ProSe to the remote UEs (105-107). The remote UEs (105-107) may connect to the base station 101 through at least one of the relay UEs (102-104). The relay UEs (102-104) may also be in a monitoring mode, wherein a remote UE (105-107) may discover one of the relay UEs (102-104) and request for ProSe.

The power consumption of the relay UEs (102-104) may be relatively higher in the announcing mode compared to that in the monitoring mode. As such, if there are no remote UEs (105-107) to provide ProSe, there is unnecessary power consumption by the relay UEs (102-104), if they are in the announcing mode. Moreover, the network resources used for providing ProSe may not be optimally utilized by the relay UEs (102-104). For example, in some cases, all relay UEs (102-104) may announce their availability to provide ProSe at the same time, which may lead to interference.

Embodiments herein disclose methods and systems for dynamically configuring operation mode of a Proximity Service (ProSe) enabled relay User Equipment (UE). The modes of ProSe operation include a monitoring mode and an announcing mode. A ProSe enabled UE authorized for performing ProSe operations, may be configured by a network to act as a relay UE when the strength of signals received from a base station satisfy various threshold conditions specified in a system information block 19 of Long Term Evolution (LTE). The relay UE may monitor the presence of other relay UEs and have the intelligence to dynamically switch from the monitoring mode to the announcing mode, and vice versa. The relay UE may switch from the announcing mode to the monitoring mode or remain in the monitoring mode if the relay UE detects that multiple relay UEs are providing the same ProSe based services to remote UEs, which are outside the coverage area of the base station. The relay UE may switch to or remain in the monitoring mode if the signal strength of the signals from the multiple relay UEs, to the remote UEs, are optimal and the multiple relay UEs have sufficient resources to provide ProSe to the remote UEs. The relay UE may switch from the monitoring mode to the announcing mode or remain in the announcing mode when there is a lack of relay UEs providing ProSe to the remote UEs and when the relay UE receives a request from at least one remote UE to provide ProSe to the at least one remote UE.

These and other aspects of the embodiments herein will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of the embodiments herein without departing from the spirit thereof, and the embodiments herein include all such modifications.

Referring now to the drawings, and more particularly to FIGS. 2 through 13, where similar reference characters denote corresponding features consistently throughout the figures, there are shown various embodiments.

Figure 2:
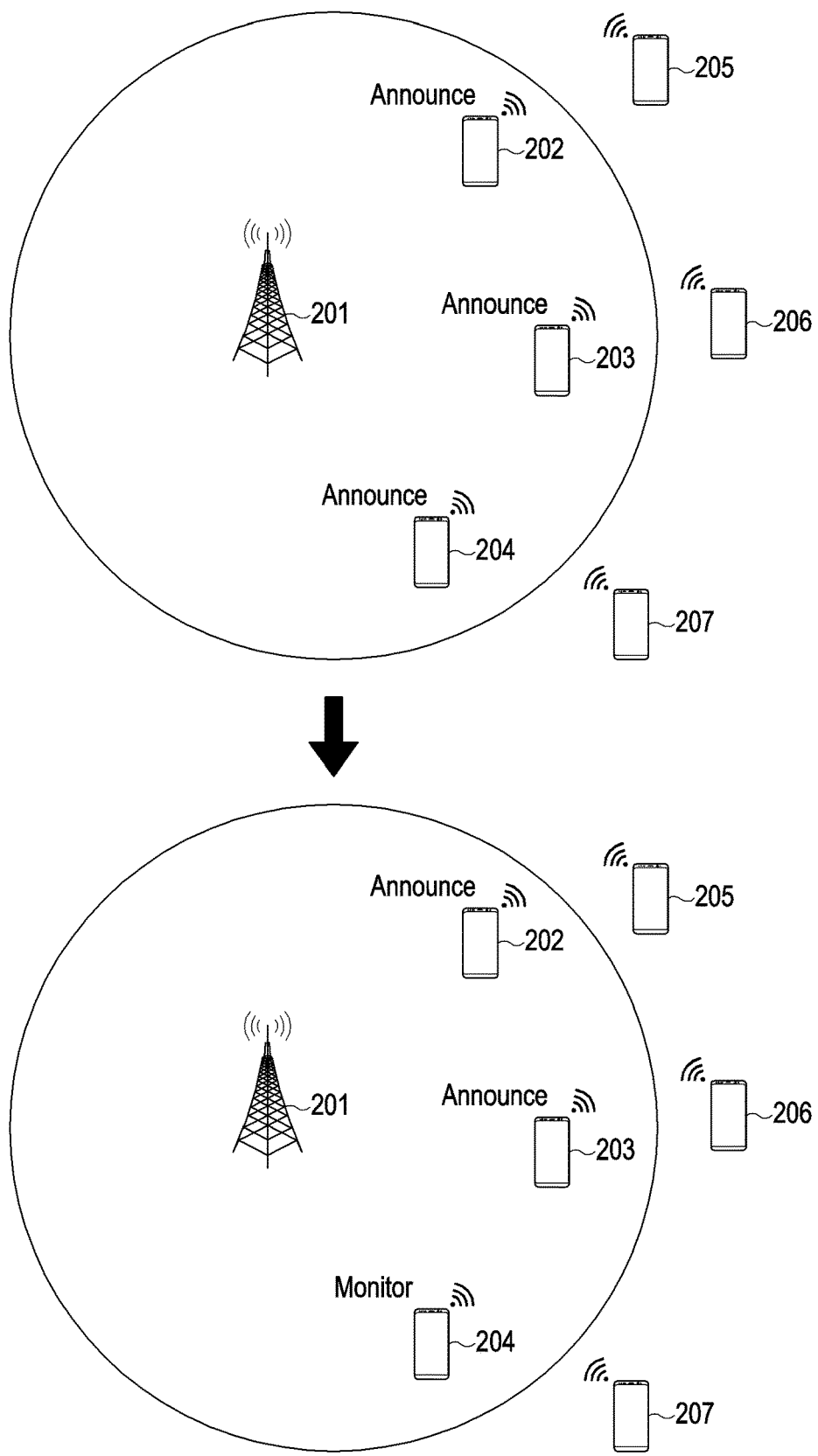
FIG. 2 depicts an example scenario of switching of a mode of a ProSe operation from an announcing mode to a monitoring mode based on a number of relay UEs providing a same ProSe, according to an embodiment.

FIG. 2 depicts an example scenario of switching of a mode of a ProSe operation from an announcing mode to a monitoring mode based on a number of relay UEs providing a same ProSe, according to embodiments. It is to be noted that the relay UEs are capable of providing ProSe based services such as relay, discovery, direct communication, and so on. In an example, the relay UEs may be considered to be providing relay services to remote UEs, not within coverage area of network. As depicted in FIG. 2, relay UEs 202, 203, and 204 are within the coverage area (indicated by the circle in FIG. 2) of the base station 201. The UEs 205, 206, and 207 are remote UEs which are outside the coverage area of the base station 201. The remote UEs (205-207) may receive ProSe from at least one of the relay UEs (202-204).

Initially, the relay UEs (202-204) are in the announcing mode. The relay UEs (202-204) may monitor the presence of other relay UEs. For example, the relay UE 204 may monitor the presence of relay UEs 202 and 203. It may be understood that the relay UEs (202-204), which are monitoring the presence of other relay UEs, may be either in the monitoring mode or in the announcing mode. If a particular relay UE (202-204) detects the presence of other relay UEs, it is to be inferred that the other relay UEs are in the announcing mode.

Consider that the relay UE 204 detects that the other relay UEs (202, 203) are providing ProSe services to the remote UEs (205-207). As the power consumption in the announcing mode is more than the power consumption in the monitoring mode, the relay UE 204 may switch to the monitoring mode on detecting that there is a sufficient number of relay UEs providing ProSe to the remote UEs (205-207), as shown in the bottom half of FIG. 2.

Figure 3:
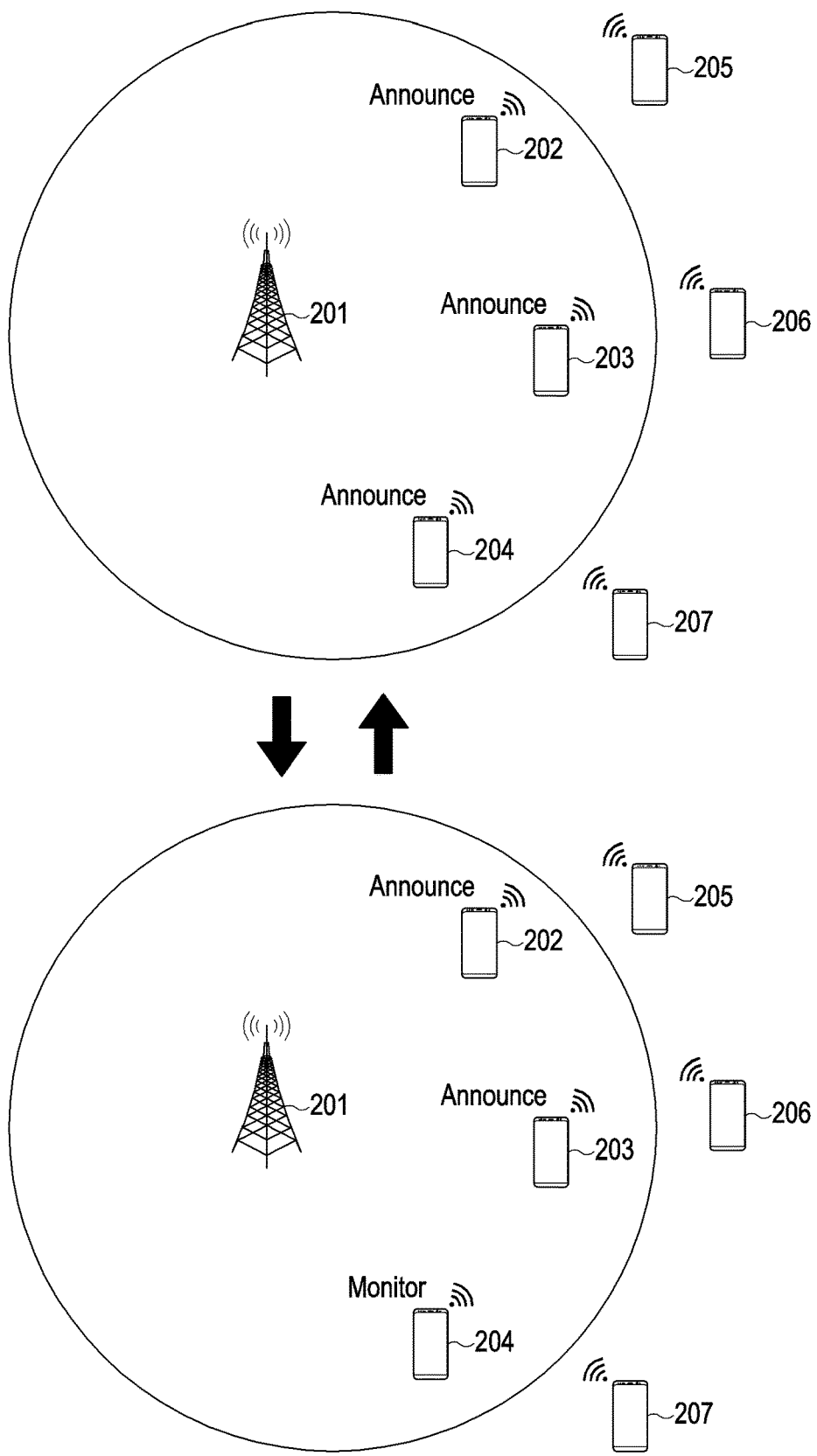
FIG. 3 depicts an example scenario of a relay UE dynamically switching from an announcing mode to a monitoring mode and vice versa, based on signal strengths of other relay UEs, according to an embodiment.

FIG. 3 depicts an example scenario of a relay UE dynamically switching from an announcing mode to a monitoring mode and vice versa based on a signal strength of other relay UEs, according to embodiments. Consider that the relay UE 204 is in the announcing mode. While in the announcing mode, the relay UE 204 may detect the presence of the relay UEs (202, 203) operating in the announcing mode. The relay UE 204 may detect that the relay UEs (202, 203) are in the announcing mode. If the relay UE 204 detects that the strength of the signals from the relay UEs (202, 203) is optimal, then the relay UE 204 may switch to the monitoring mode, as shown in the bottom half of FIG. 3. For example, the relay UE 204 may detect whether the signal strength of the signals from the relay UEs (202, 203) is greater or equal to a signal strength threshold, and if the signal strength is greater than or equal to the signal strength threshold, the relay UE 204 may switch to the monitoring mode; otherwise the relay UE 204 may remain in the announcing mode.

The relay UE 204 may continue to monitor the presence of the relay UEs (202, 203) while operating in the monitoring mode. If the relay UE 204 detects that the strength of the signals from the relay UEs (202, 203) is not optimal (e.g., the strength is less than the signal strength threshold), then the relay UE 204 may switch back to the announcing mode, as shown in the top half of FIG. 3.

Figure 4:
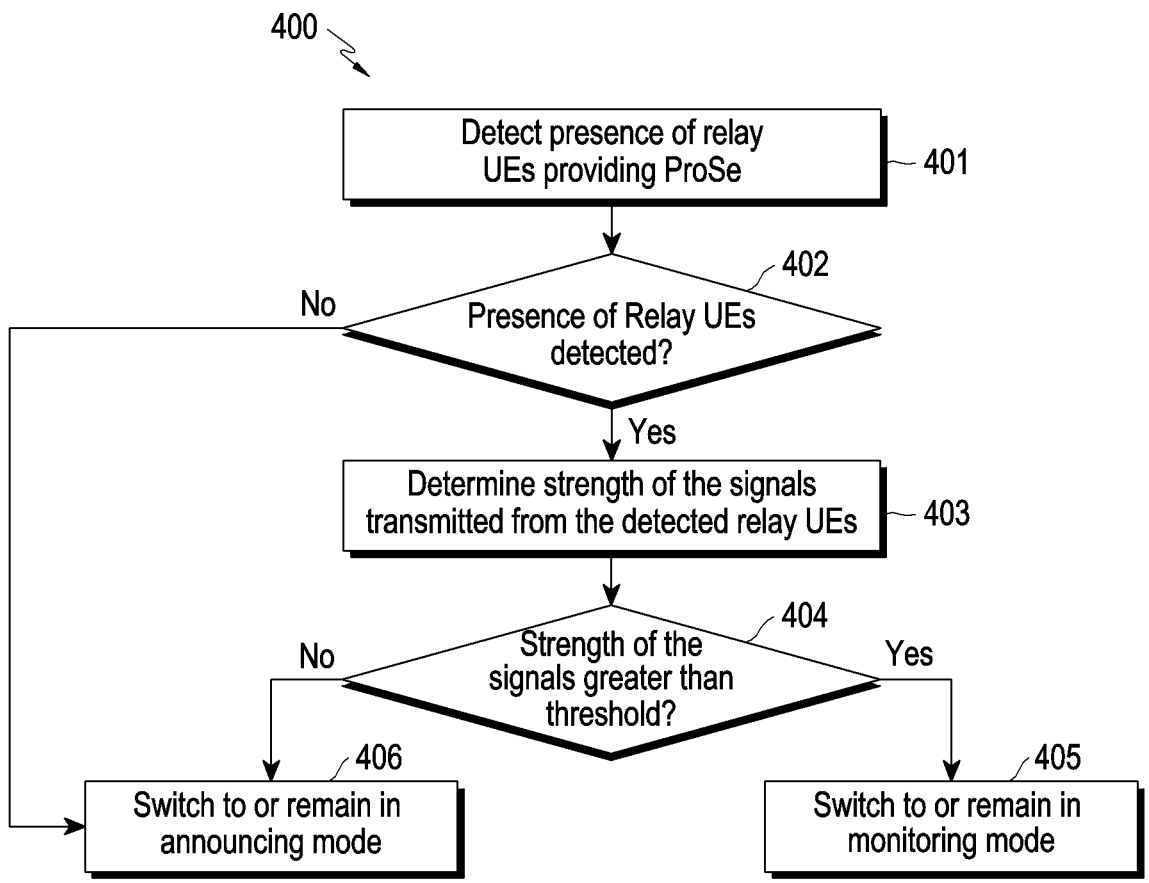
FIG. 4 is a flow chart depicting a method of dynamically configuring a mode of a ProSe operation based on a number of the relay UEs providing ProSe, and signal strengths of the relay UEs providing ProSe, according to an embodiment.

FIG. 4 is a flow chart depicting a method of dynamically configuring a mode of a ProSe operation based on a number of relay UEs providing ProSe and signal strengths of the relay UEs providing ProSe, according to embodiments. At step 401, the method includes monitoring the presence of relay UEs providing ProSe within the coverage area of a base station. The UEs providing ProSe are in the announcing mode. Consider that the UE 204 is monitoring in order to detect the presence of other relay UEs providing ProSe within the coverage area of the base station currently servicing the UE 204. The UE 204 may be either in the announcing mode or in the monitoring mode.

At step 402, the method includes detecting whether there is a presence of relay UEs. If the presence of relay UEs is detected (step 402, Yes), then the method includes, at step 403, determining the strength of the signals transmitted from the detected relay UEs. Consider that the UE 204 detects the presence of the relay UEs (202, 203). The UE 204 may, thereafter, determine the strength of the signals from the relay UEs (202, 203). At step 404, the method includes determining whether the strength of the signals is greater than a signal strength threshold.

If the strength of the signals is greater than the signal strength threshold (step 404, Yes), the method includes, at step 405, switching to the monitoring mode. Consider that the relay UE 204 detects that the strength of the signals from the relay UEs (202, 203) is greater than the signal strength threshold. Thereafter, the relay UE 204, at step 405, may either switch to the monitoring mode, if the relay UE 204 is in the announcing mode, or continue to operate in the monitoring mode if the relay UE 204 is in the monitoring mode.

If the strength of the signals is less than the signal strength threshold (step 404, No), the method includes, at step 406, switching to the announcing mode. Consider that the relay UE 204 detects that the strength of the signals from the relay UEs (202, 203) are less than the signal strength threshold. Thereafter, the relay UE 204, at step 406, may either switch to the announcing mode, if the relay UE 204 is in the monitoring mode, or continue to operate in the announcing mode if the relay UE 204 is in the announcing mode.

If relay UEs, providing ProSe, are not detected at step 402 (step 402, No), then, at step 405, the method includes switching to the announcing mode. Consider that that UE 204 is not able to detect the presence of the relay UEs (202, 203). The relay UE 204 may, thereafter, switch to the announcing mode.

The various actions in method 400 may, in some embodiments, be performed in the order presented, in a different order or simultaneously. Further, in some embodiments, some actions listed in FIG. 4 may be omitted.

Figure 5:
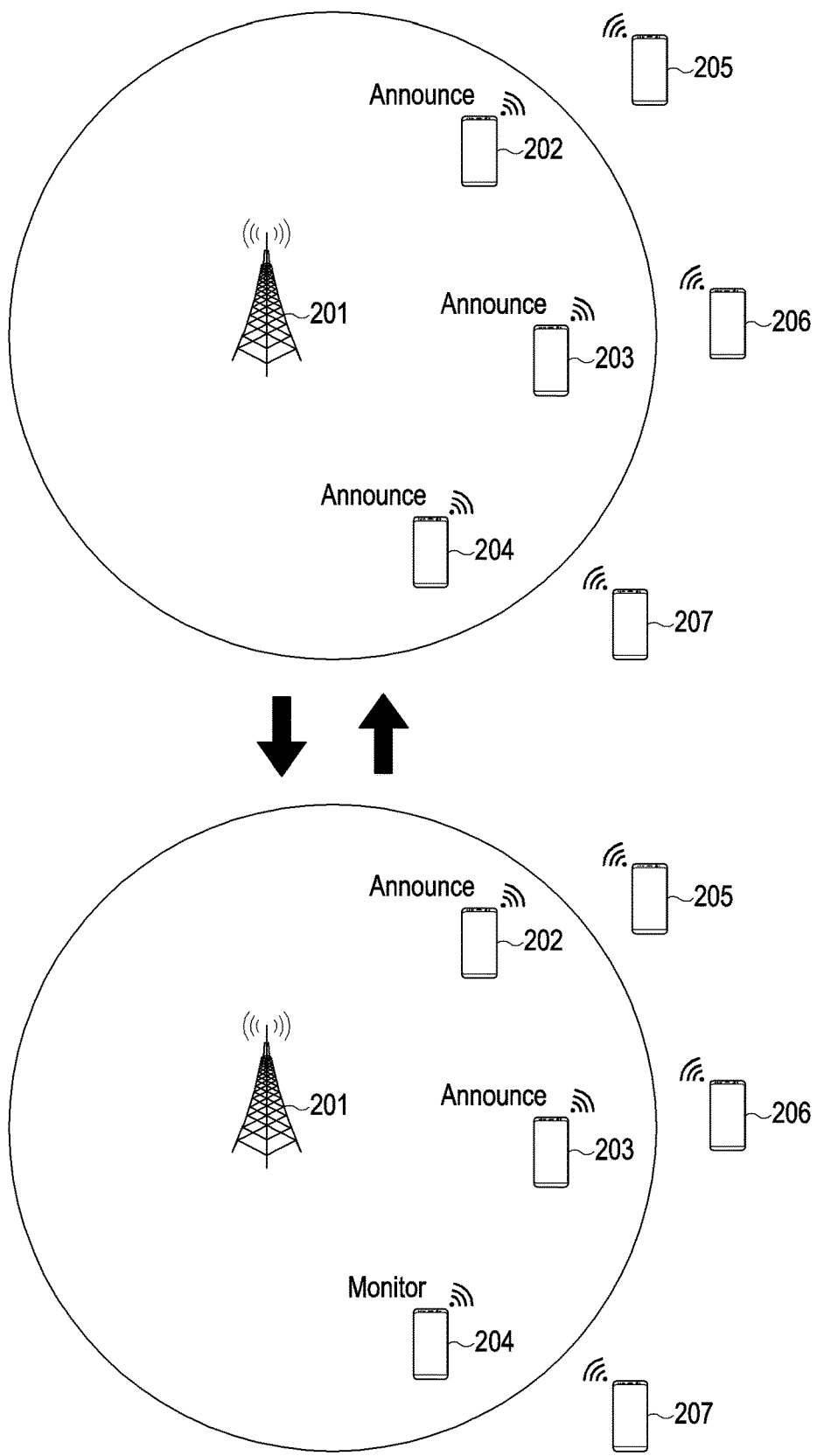
FIG. 5 depicts an example scenario of a relay UE dynamically switching from an announcing mode to a monitoring mode and vice-versa, based on resource availability of other relay UEs, according to an embodiment.

FIG. 5 depicts an example scenario of a relay UE dynamically switching from an announcing mode to a monitoring mode and vice-versa, based on resource availability of other relay UEs, according to embodiments. Consider that the relay UE 204 is in the announcing mode. While in the announcing mode, the relay UE 204 may detect the presence of the relay UEs (202, 203). The relay UE 204 may detect that the relay UEs (202, 203) are in the announcing mode. If the relay UE 204 detects that the relay UEs (202, 203) have sufficient resources to provide ProSe to the remote UEs (205-207), then the relay UE 204 may switch to the monitoring mode, as shown in the bottom half of FIG. 5.

The relay UE 204 may continue to monitor the presence of the relay UEs (202, 203). If the relay UE 204 detects that the relay UEs (202, 203) do not have sufficient resources to provide ProSe to the remote UEs (205-207), then the relay UE 204 may switch back to the announcing mode.

In an example, consider that data from the base station 201 is being relayed by the relay UEs (202, 203) to the remote UEs (205-207). If sufficient resources (e.g., status indicator bit of the relay UE, enough memory at the relay UE to handle the volume of data, transmission bandwidth to handle the data in the relay UE, etc.) are not available to the relay UEs (202, 203) in order to relay the data to the remote UEs (205-207), then the UE 204 may switch to the announcing mode. On the other hand, if sufficient resources are available, then the UE 204 may switch to the monitoring mode.

Figure 6:
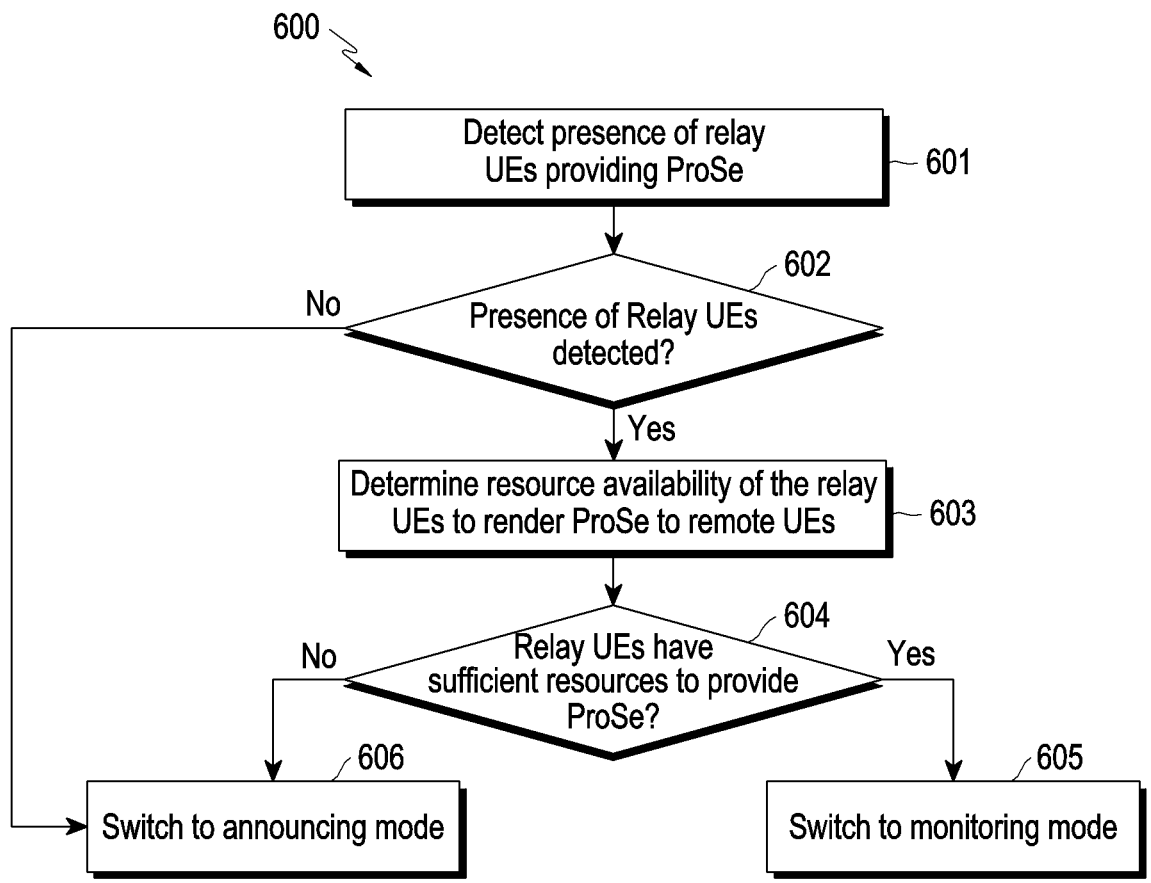
FIG. 6 is a flow chart depicting a method of dynamically configuring a mode of a ProSe operation of a relay UE based on resource availability of other relay UEs, according to an embodiment.

FIG. 6 is a flow chart depicting a method of dynamically configuring a mode of a ProSe operation of a relay UE based on resource availability of other relay UEs, according to embodiments. At step 601, the method includes detecting the presence of relay UEs providing ProSe. Consider that the UE 204 is monitoring presence of other relay UEs providing ProSe within the coverage area of the base station currently servicing the UE 204.

At step 602, the method includes determining whether presence of relay UEs providing ProSe is detected. If the presence of relay UEs providing ProSe is detected (step 602, Yes), then the method includes, at step 603, determining the ProSe resource availability of the detected relay UEs. The ProSe resource availability may be ascertained from a status indicator bit. If the status indicator bit is 0, it may be concluded that the relay UEs may not have sufficient resources to provide ProSe to the remote UEs. On the other hand, if the status indicator bit is 1, it may be concluded that the relay UEs have sufficient resources to provide ProSe to the remote UEs.

Consider that the UE 204 detects the presence of the relay UEs (202, 203). The UE 204 may determine the resource availability of the relay UEs (202, 203) for rendering ProSe.

At step 604, the method includes determining whether the relay UEs have sufficient resources to provide ProSe to the remote UEs.

If the relay UEs have sufficient resources to provide ProSe to remote UEs (step 604, Yes), the method includes, at step 605, switching to the monitoring mode. Consider that the relay UE 204 determines that the relay UEs (202, 203) have sufficient resources to provide ProSe to the remote UEs (205-207). Thereafter, the relay UE 204, at step 605, may switch to the monitoring mode.

If the relay UEs do not have sufficient resources to provide ProSe to the remote UEs (step 604, No), then the method includes, at step 606, switching to the announcing mode. Consider that the relay UE 204 determines that the relay UEs (202, 203) do not have sufficient resources to provide ProSe to remote UEs (205-207). Thereafter, the relay UE 204, at step 606, may switch to the announcing mode.

If relay UEs providing ProSe are not detected at step 602 (step 602, No), then, at step 606, the method includes switching to the announcing mode. Consider that that UE 204 is not able to detect the presence of other relay UEs. The relay UE 204 may, thereafter, switch to the announcing mode.

The various actions in method 600 may be performed, in some embodiments, in the order presented, in a different order or simultaneously. Further, in some embodiments, some actions listed in FIG. 6 may be omitted.

Figure 7:
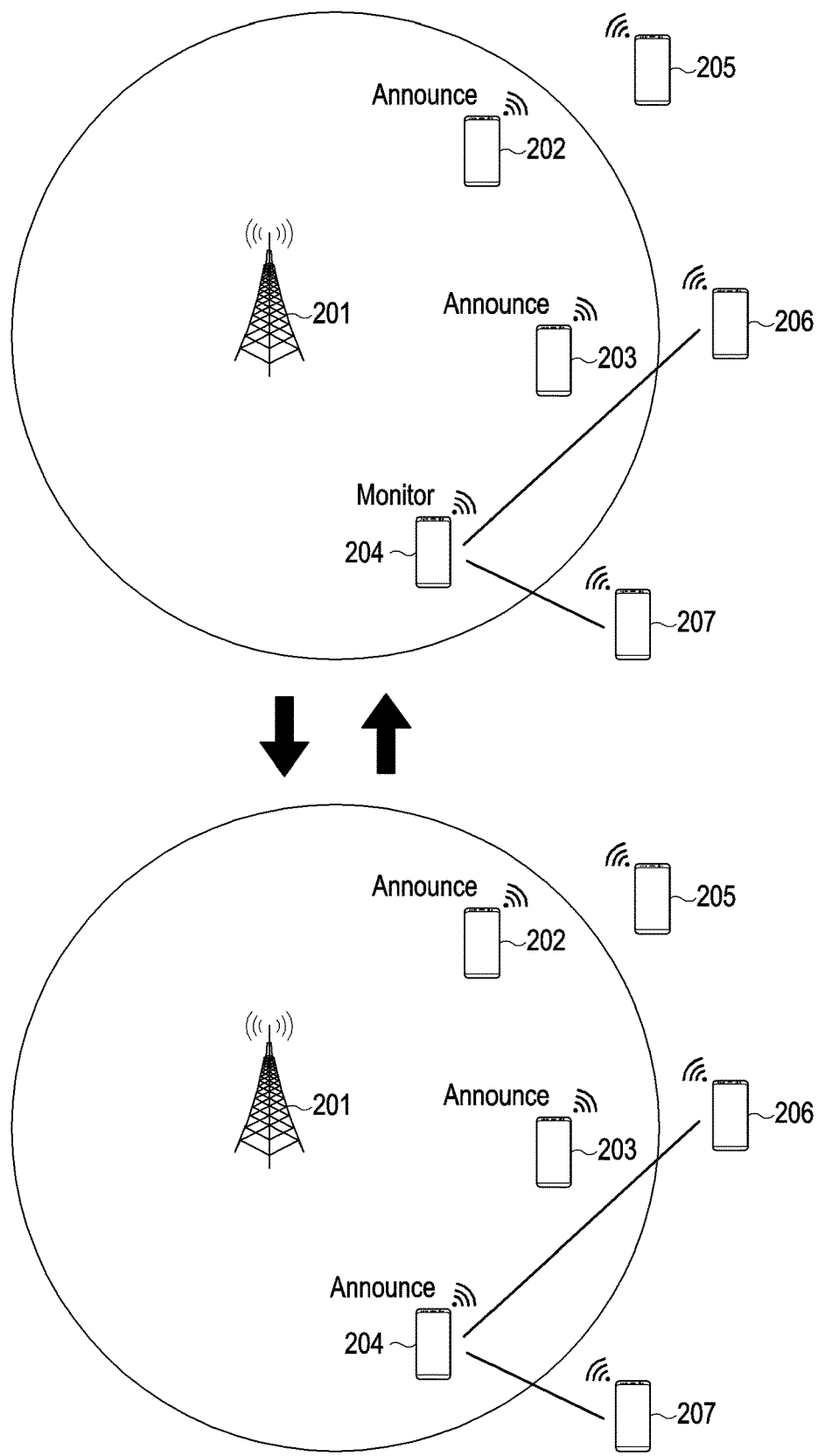
FIG. 7 depicts an example scenario of dynamic switching from a monitoring mode to an announcing mode by a relay UE, according to an embodiment.

FIG. 7 depicts an example scenario of dynamic switching from a monitoring mode to an announcing mode by a relay UE, according to embodiments. The UE 204 may switch from the monitoring mode to the announcing mode when at least one remote UE (206, 207) requests for ProSe from the UE 204.

As depicted in FIG. 7, when the remote UEs (206, 207) request the relay UE 204 for ProSe, the relay UE 204 may switch from the monitoring mode to the announcing mode, as shown in the bottom part of FIG. 7. This may occur in scenarios such as when there is a shortage of relay UEs rendering ProSe, strength of the signals transmitted from the relay UEs is below the threshold signal strength, the relay UEs do not have sufficient resources to render ProSe to the remote UEs (206, 207), and so on.

Figure 8:
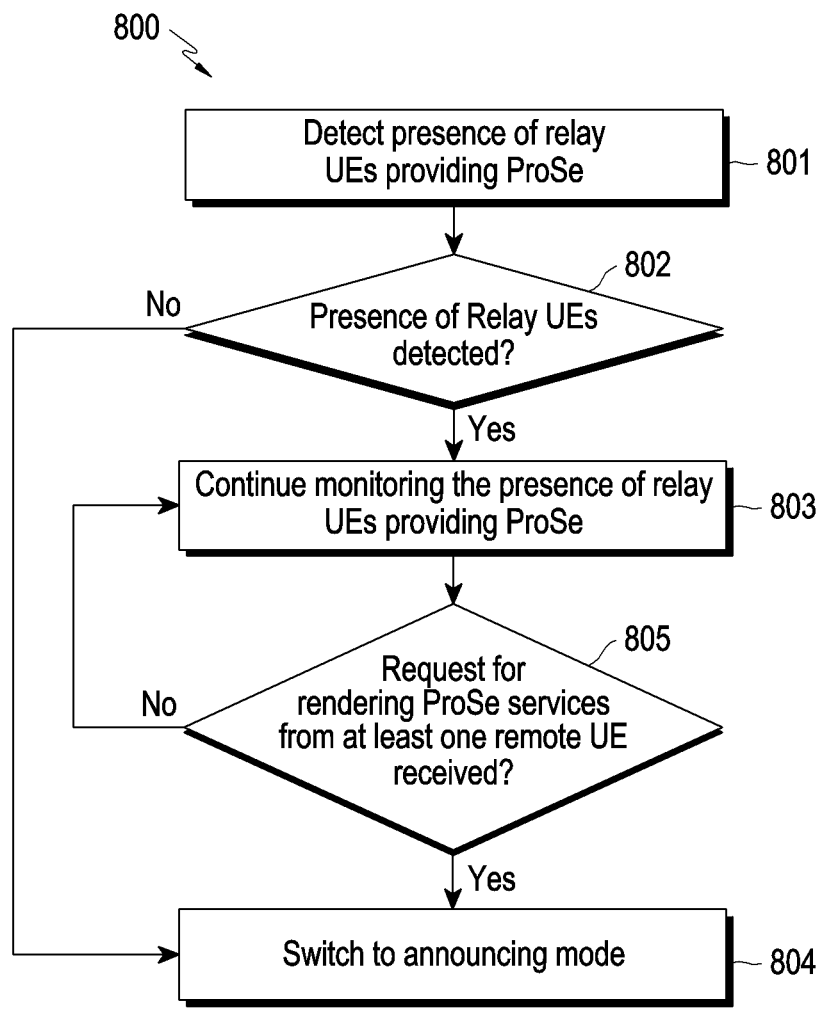
FIG. 8 is a flow chart depicting the method of dynamically configuring a mode of a ProSe operation from a monitoring mode to an announcing mode, on receiving request from at least one remote UE, according to an embodiment.

FIG. 8 is a flow chart depicting the method of dynamically configuring a mode of a ProSe operation from a monitoring mode to an announcing mode, on receiving request from at least one remote UE, according to embodiments. At step 801, the method includes detecting presence of relay UEs providing ProSe. Consider that the UE 204 is monitoring in order to detect the presence of the relay UEs providing ProSe within the coverage area of the base station currently servicing the UE 204.

At step 802, the method includes determining whether relay UEs are present, i.e., determine whether at least one relay UE has been detected. If the presence of at least one relay UE is detected (step 802, Yes), then the method includes, at step 803, continuing to monitor the presence of the relay UEs providing ProSe. Consider that the UE 204 detects the presence of the relay UEs (202, 203). The UE 204 may remain in the monitoring mode. If the presence of the relay UEs is not detected (step 802, No), then the method includes, at step 804, switching to the announcing mode. Consider that the UE 204 does not detect presence of any relay UE. The UE 204 may switch to the announcing mode. At step 805, the method includes determining whether a request is received from at least one remote UE to render ProSe. If the request is received (step 805, Yes), the method includes switching to the announcing mode.

If the UE 204 is in the monitoring mode and receives a request, at step 805, for rendering ProSe, from at least one remote UE (206, 207), then the UE 204 may switch to the announcing mode from the monitoring mode. If requests for rendering ProSe are not received (step 805, No), then the UE 204 may continue to detect presence of the relay UEs providing ProSe.

The various actions in method 800 may be performed, in some embodiments, in the order presented, in a different order or simultaneously. Further, in some embodiments, some actions listed in FIG. 8 may be omitted.

Figure 9:
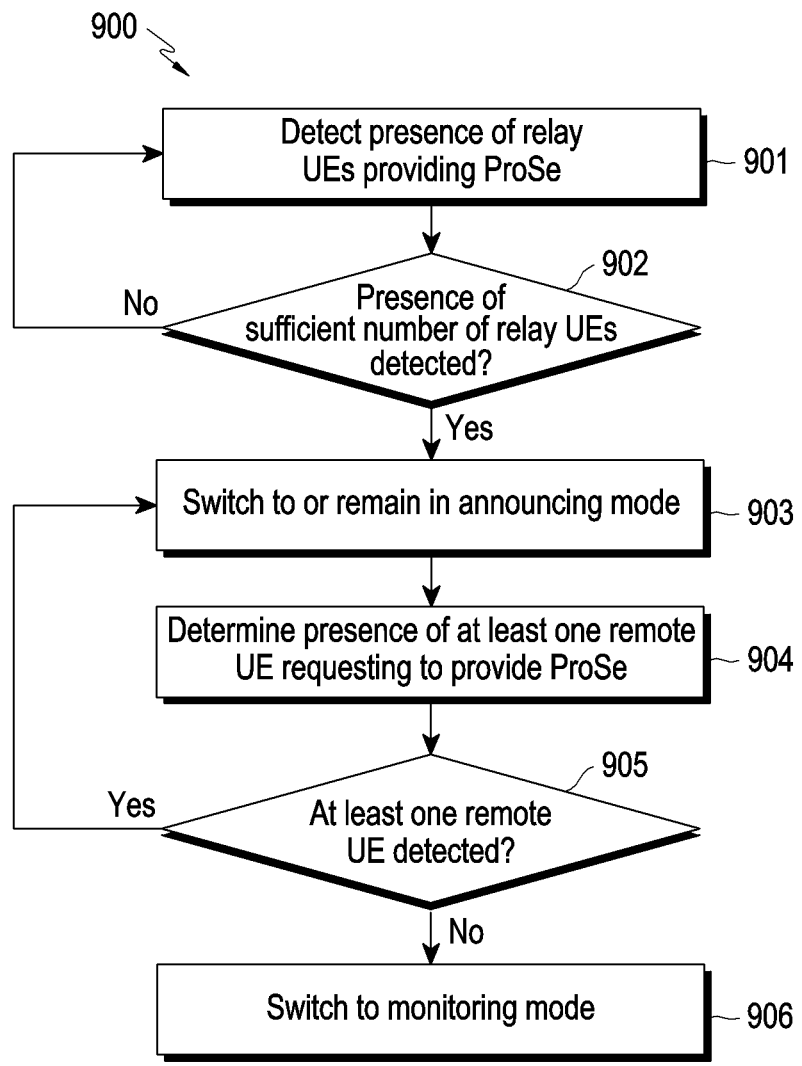
FIG. 9 is a flow chart depicting a method of dynamically configuring a mode of a ProSe operation from a monitoring mode to an announcing mode and vice versa based on a number of relay UEs providing ProSe and a presence of remote UEs, according to an embodiment.

FIG. 9 is a flow chart depicting a method of dynamically configuring a mode of a ProSe operation from a monitoring mode to an announcing mode and vice versa based on a number of relay UEs providing ProSe and a presence of remote UEs, according to embodiments. At step 901, the method includes detecting the presence of relay UEs which are providing ProSe in the announcing mode. In an example, consider that the UE 204 is in the monitoring mode and detecting the presence of the relay UEs providing ProSe within the coverage area of the base station currently servicing the UE 204

At step 902, the method includes determining whether there is a presence of a sufficient number of relay UEs to provide ProSe to the remote UEs. If the presence of a sufficient number of relay UEs is detected (step 902, Yes), then the method includes, at step 903, switching to the announcing mode. Consider that the UE 204 switches to the announcing mode. The UE 204 may announce its availability to provide ProSe to remote UEs, if any. At step 904, the method includes determining presence of at least one remote UE requesting to provide ProSe.

At step 905, the method includes determining whether at least one remote UE has been detected. If no remote UEs are detected (step 905, No), the method includes, at step 906, switching to the monitoring mode.

In an embodiment, the method includes remaining in the monitoring mode for a predefined time period. If presence of relay UEs is not detected within the predefined time period, then the method includes switching from the monitoring mode to the announcing mode (step 903). However, if remote UEs are not detected while in the announcing mode, then the method includes switching from the announcing mode to the monitoring mode. However, the method includes remaining in the monitoring mode for a time period greater than the predefined time period if presence of relay UEs is not detected while in the monitoring mode.

Subsequently, the time period for which the method includes remaining in the monitoring mode increases, if remote UEs are not detected while in the announcing mode, until the time period reaches a threshold time period. Consider that the UE 204 switches to the monitoring mode on detecting that requests for receiving ProSe are not received while the UE 204 is in the announcing mode. Thereafter, the UE 204 may switch to the monitoring mode and monitor presence of other relay UEs. If no relay UEs are present, the UE 204 may switch to the announcing mode again. If requests for receiving ProSe are still not received, the UE 204 may switch to the monitoring mode and remain in the monitoring mode for a greater period if remote UEs are not detected.

If the presence of sufficient number of relay UEs are not detected (step 902, No), then the method includes performing step 901, wherein the method includes detecting the presence of the detected relay UEs. In step 905, if at least one remote UE, requesting for ProSe, is detected (step 905, Yes), then, at step 903, the method includes remaining in the announcing mode.

The various actions in method 900 may be performed, in some embodiments, in the order presented, in a different order or simultaneously. Further, in some embodiments, some actions listed in FIG. 9 may be omitted.

Figure 10:
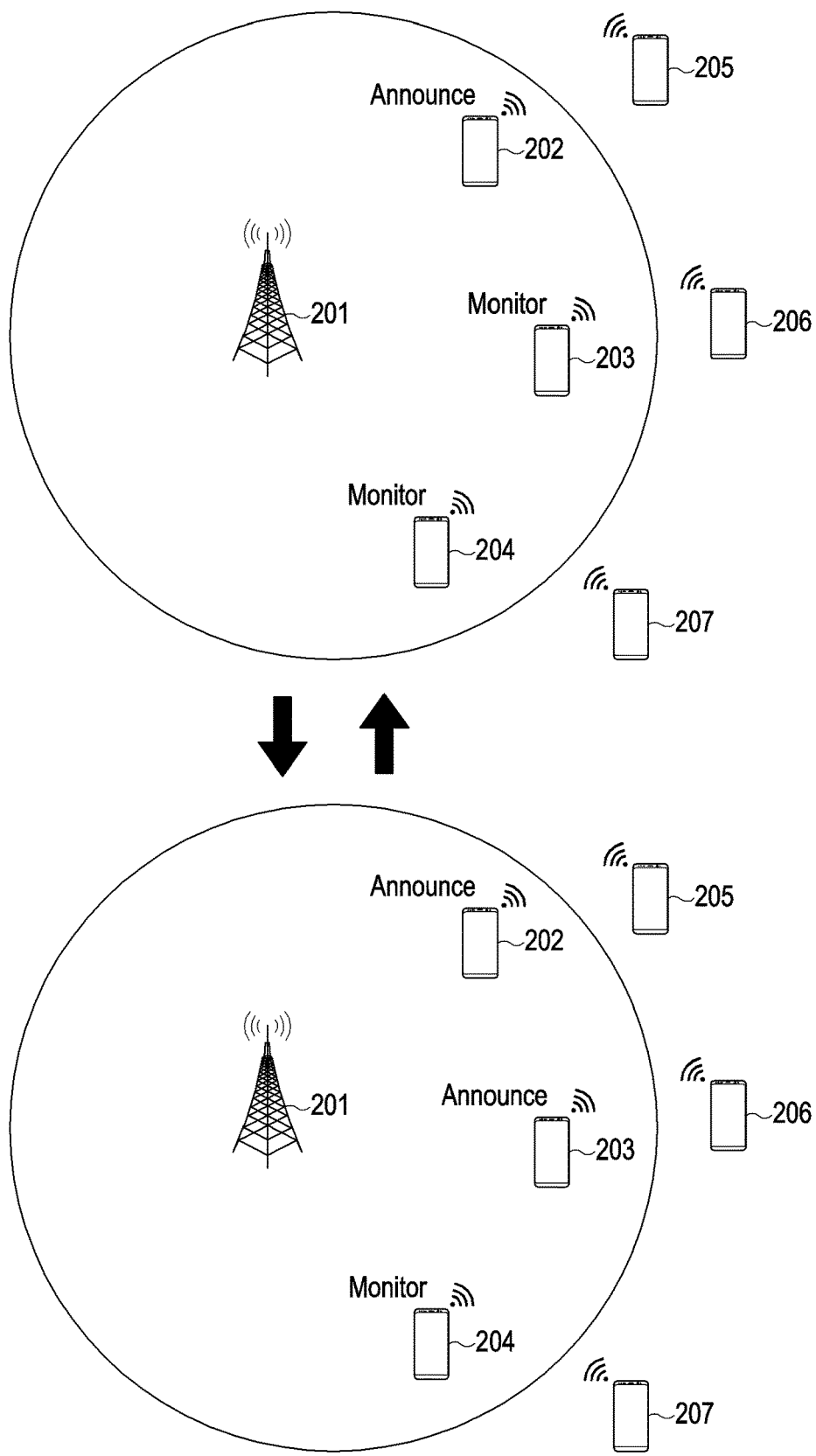
FIG. 10 depicts negotiations between relay UEs for managing switching of a mode of a ProSe operation, according to an embodiment.

FIG. 10 depicts negotiations between relay UEs for managing switching of a mode of a ProSe operation, according to embodiments. The relay UEs (202-204) may negotiate with each other in order to reach a consensus as to when to operate in the announcing mode and when to operate in the monitoring mode. The relay UEs (202-204) may also mutually fix an announcing time period for which each relay UE (202-204) will operate in the announcing mode and a monitoring time period for which each relay UE (202-204) will operate in the monitoring mode. Each relay UE may notify other relay UEs if the relay UE switches the mode of ProSe operation, from the monitoring mode to the announcing and vice versa, which was negotiated earlier.

In an example, as depicted in FIG. 10, consider that the relay UEs (202-204) have negotiated among themselves that the relay UE 202 will be in announcing mode and the relay UEs 203 and 204 will be in monitoring mode. Initially, a relay UE 202 may detect other relay UEs (203, 204) and monitor for the mode of ProSe operation. Once the relay UEs 203 and 204 are detected, the UE 202 may initiate the negotiation procedure. The negotiation procedure involves multicasting or broadcasting a negotiation message to the relay UEs 203 and 204. Based on the negotiation message, the relay UEs (202-204) may either remain in the current mode of operation or switch to another mode of operation. If due to a certain condition, the relay UE 203 switches to the announcing mode, the relay UE 203 may notify the other relay UEs (202, 204). The UE 203 may notify the relay UEs (202, 204) by transmitting a negotiation message to the relay UEs (202, 204).

In an embodiment, the negotiation message may include at least one of the parameters such as relay service code, preference indicator, preference rank and a random factor. The preference indicator may indicate whether a relay UE prefers to be in the announcing mode or the monitoring mode. The preference rank may indicate the preference values of a relay UE to provide ProSe in the announcing and monitoring modes. The preference rank for a particular mode of ProSe operation may be determined based on the capabilities of the relay UE such as battery level, resource capability, processing capability, protocol feature support, dual connectivity, carrier aggregation, and so on.

The relay UEs with a higher preference rank for the announcing mode may provide ProSe to the remote UEs in the announcing mode. Similarly, the relay UEs with a higher preference rank for the monitoring mode may offer ProSe in the monitoring mode. Multiple relay UEs with same preference rank may be prioritized to provide ProSe based on a random factor.

The relay UEs in the announcing mode may transmit the negotiation message periodically to other relay UEs which are in the monitoring mode. The relay UEs may either change the mode of operation or remain in the current mode of operation based on the received negotiation message. The relay UEs having a lower value of preference rank may also choose to operate in the announcing mode as an implementation choice. The relay UEs with the same preference rank for a particular ProSe mode of operation may be chosen fairly based on a random factor.

Figure 11:
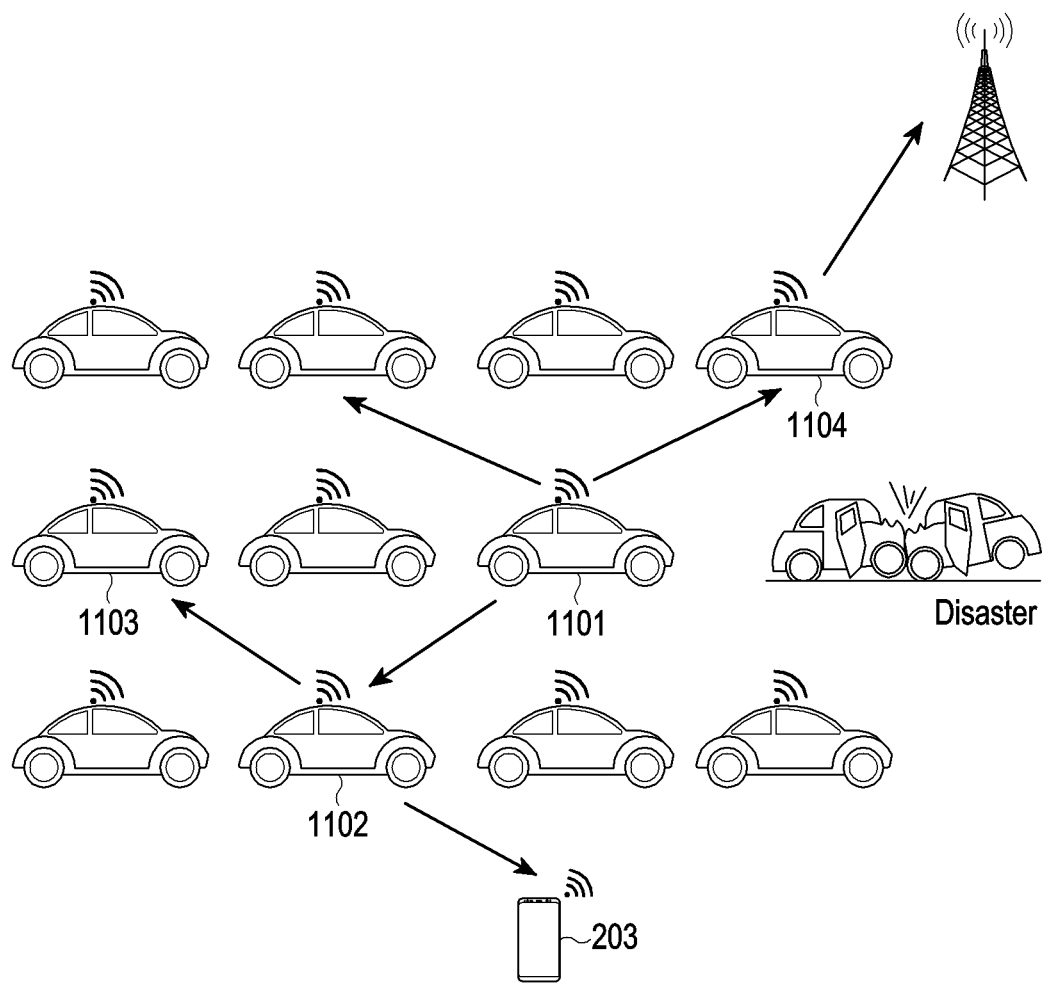
FIG. 11 depicts dynamically switching a mode of a ProSe operation from a monitoring mode to an announcing mode and vice-versa in Vehicle-to-Everything (V2X) communication, according to an embodiment.

FIG. 11 depicts dynamically switching a mode of a ProSe operation from a monitoring mode to an announcing mode and vice-versa in Vehicle-to-Everything (V2X) communication, according to embodiments. The mode of operation of ProSe of V2X devices may be configured dynamically in certain scenarios. In one example scenario, multiple V2X devices may be transmitting the same signals or messages. In another example scenario, the mode of ProSe operation may be configured dynamically based on the strength of the signal from the V2X devices. Examples of the V2X device may be, but are not limited to, a vehicle, a pedestrian UE, a base station, a Road Side Unit (RSU), and so on.

In an example, consider that a V2X device 1101 has visualized a disaster. The V2X device 1101 may transmit a signal conveying information of the disaster. The V2X device 1101 may transmit this signal further to other V2X devices. Similarly, the V2X device 1102 may also receive the signal and transmit the signal to other V2X devices. In this manner, the signal may be received again by the V2X device 1102, 1103, and so on. The embodiments include avoiding the transmission of such redundant data, which may save radio resources and power of the V2X devices. A V2X device may identify whether a received signal has been relayed by other V2X devices in a particular area. The identification may be performed by checking a hop count factor included in the received signal.

The V2X devices which receive the signal may be in the monitoring mode. When the V2X devices transmit, or relay, the signal, the V2X devices switch to the monitoring mode.

In an example, consider that the V2X device 1101 is in the announcing mode and is the original transmitter of a signal. The hop count factor of the signal at this stage may be 0. When the signal is received by the V2X device 1102, the hop count factor of the signal becomes 1. Similarly, when the signal is received by the V2X device 1103 from the V2X device 1102, the hop count factor of the signal becomes 2. In this way, the hop count factor keeps incrementing. If the hop count factor increases beyond a threshold hop count, then the signal may be considered as redundant information. If a receiving V2X device identifies that the hop count of the signal is more than the threshold hop count, then the receiving V2X device may switch to the monitoring mode and avoid transmitting the signal to further V2X devices. On the other hand, if the V2X device identifies that the hop count of the received signal is less than the threshold hop count, then the V2X device may switch to the announcing mode and transmit the signal to further V2X devices.

The switching from the announcing mode to the monitoring mode, and vice versa, may be based on the strength of the received signal. If the hop count is greater than a hop count threshold and the strength of the signal is below a minimum signal strength threshold, then a V2X device may switch to the announcing mode and transmit the signal. If the hop count is greater than the hop count threshold and the strength of the signal is above the minimum signal strength threshold, then the V2X device may remain in the monitoring mode and refrain from transmitting the signal to further V2X devices.

Figure 12:
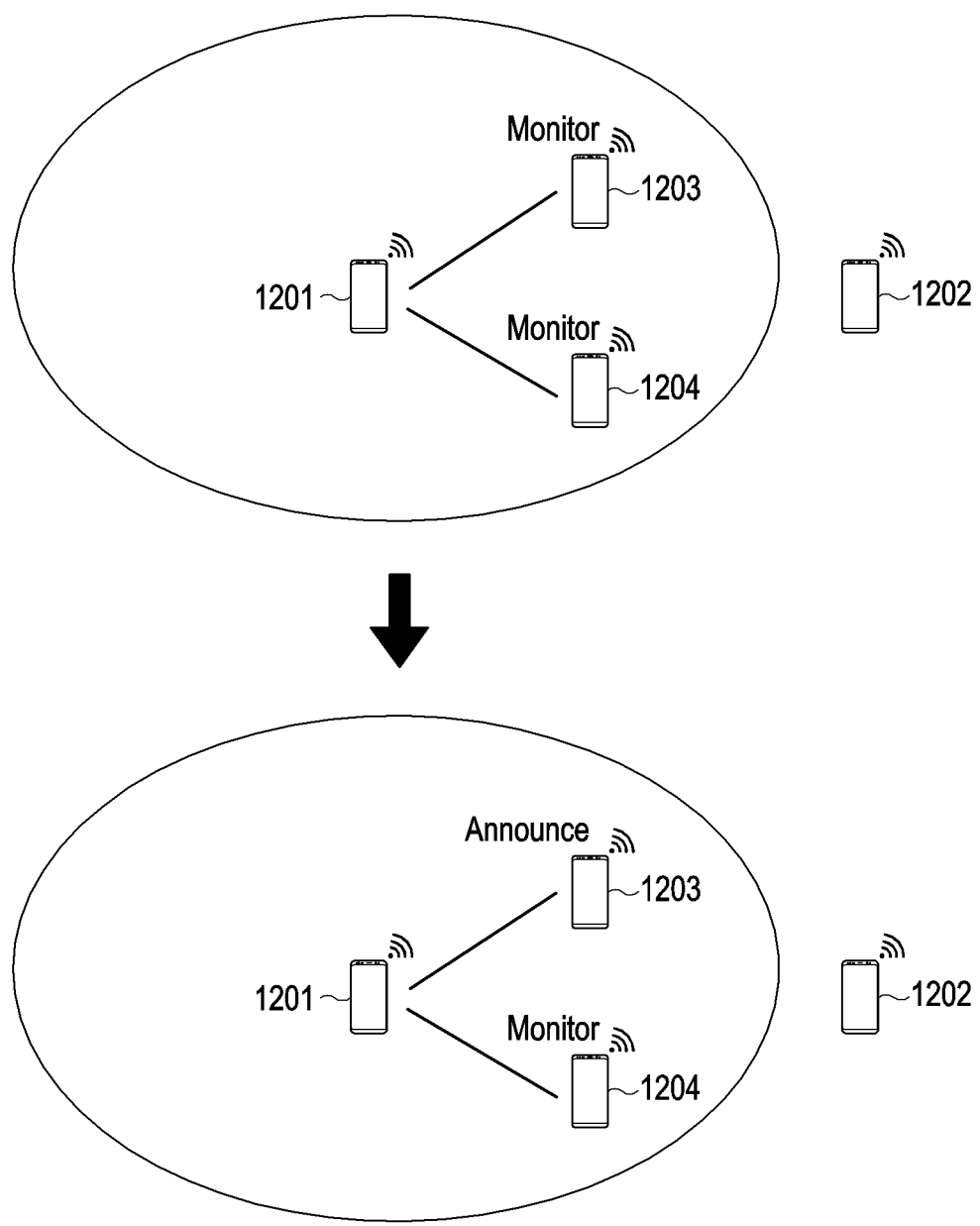
FIG. 12 depicts an example scenario of dynamic switching of a mode of a ProSe operation in an unlicensed band, according to an embodiment.

FIG. 12 depicts an example scenario of dynamic switching of a mode of a ProSe operation in an unlicensed band, according to embodiments. A plurality of UEs using an LTE chipset and having a device-to-device (D2D) stack may have ProSe communication among the UEs in an unlicensed band. The UEs may communicate in the unlicensed band if they are within the coverage area of the network or outside the coverage area of the network. A UE may switch from the announcing mode to the monitoring mode based on circumstances such as the number of UEs providing ProSe, strength of the signals from the UEs, resource capability of the UEs to provide ProSe, requests from UEs to provide ProSe, non-availability of UEs providing ProSe, and so on.

As depicted in FIG. 12, consider that a UE 1201 desires to locate a UE 1202, in a certain location, over an unlicensed D2D band. The UE 1202 is outside the range of the UE 1201. The UE 1201 may request the UEs (1203, 1204) in its vicinity to provide ProSe. Once the request is received, consider that a UE 1203 may switch to the announcing mode and render ProSe to the UE 1201. The UE 1204 may remain in the monitoring mode. The UE 1204 may detect the presence of the UE 1203 and determine that the UE 1203 is operating in the announcing mode. The UE 1204 may switch to the announcing mode if the strength of the signal from the UE 1203 is lower than a signal strength threshold, or if the UE 1203 does not have the resource capabilities to provide ProSe services to the UE 1202.

Figure 13:
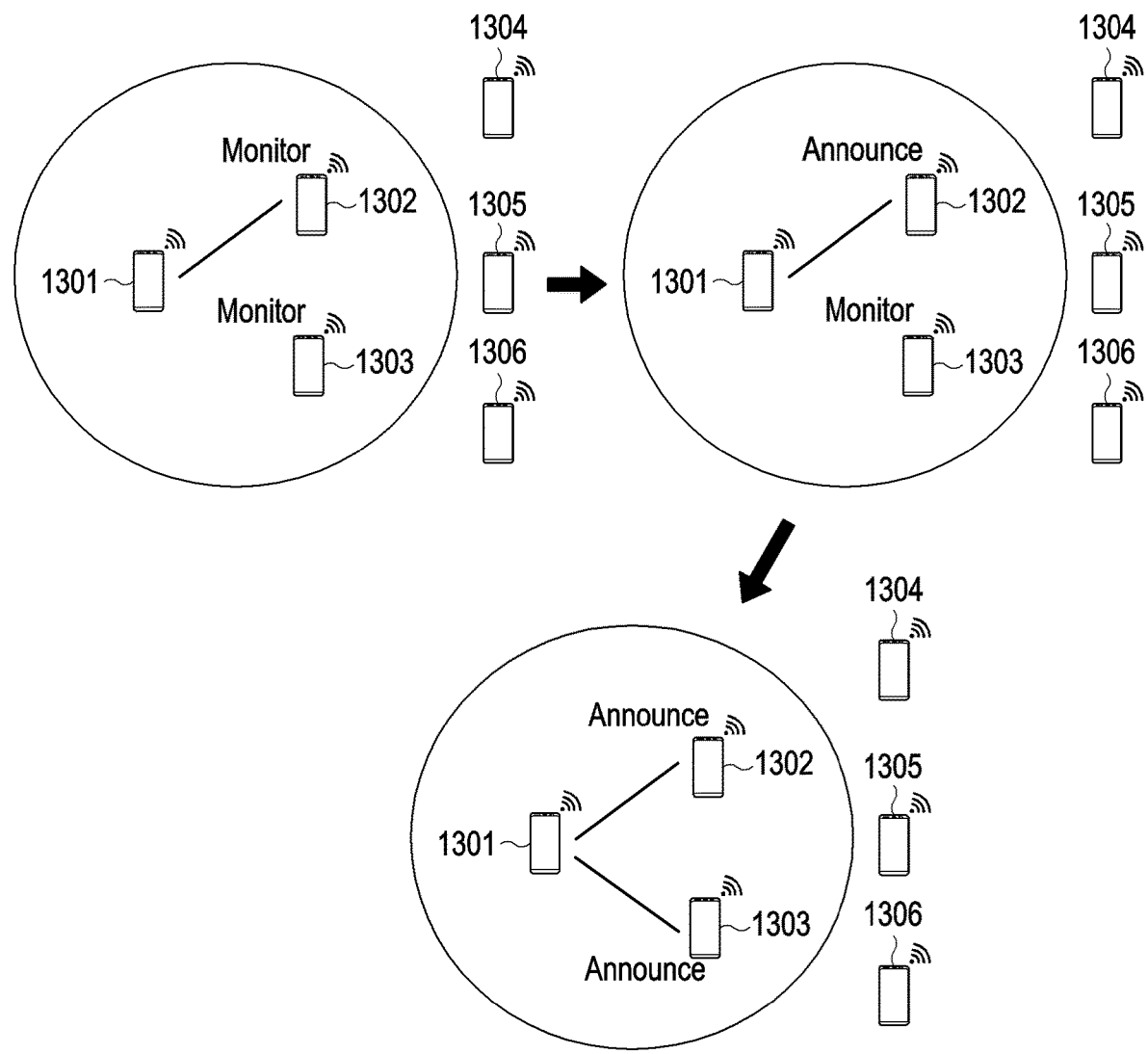
FIG. 13 depicts another example scenario of dynamic switching of a mode of a ProSe operation in an unlicensed band, according to an embodiment.

FIG. 13 depicts another example scenario of dynamic switching of a mode of a ProSe operation in an unlicensed band, according to embodiments. As depicted in FIG. 13, consider that the UE 1301 intends to broadcast a message to UEs (1304-1306). The UEs (1304-1306) are outside the coverage area of the UE 1301. The UE 1301 may request the UE 1302 to provide ProSe. The UE 1302 may provide ProSe to the UE 1301. However, if the UE 1302 does not have sufficient resources to render ProSe, then the UE 1303, operating in the monitoring mode, may switch to the announcing mode and join the UE 1302 in rendering ProSe to the UE 1301.

The embodiments disclosed herein may be implemented through at least one software program running on at least one hardware device and performing network management functions to control the network elements. The network elements shown in FIGS. 2, 3, 5, 7, and 10-13 include blocks which may be at least one of a hardware device, or a combination of hardware device and software module.

The embodiments disclosed herein describe methods, apparatuses, devices and systems for dynamically configuring the mode of ProSe operation of a relay UE. Therefore, it will be understood that the scope of the protection is extended to such a program and in addition to a computer readable storage medium having a message therein, such computer readable storage medium contain program code for implementing one or more steps of the methods described above, when the program code runs on a server or mobile device or any suitable programmable device. The methods described above may be implemented in an embodiment through or together with a software program written in e.g. Very high speed integrated circuit Hardware Description Language (VHDL), another programming language, or implemented by one or more VHDL or several software modules being executed on at least one hardware device. The hardware device may be any kind of portable device that may be programmed. The device may also include hardware like e.g. an ASIC, or a combination of hardware and software, e.g. an ASIC and an FPGA, or at least one microprocessor and at least one memory with software modules located therein. The method embodiments described herein may be implemented partly in hardware and partly in software. Alternatively, the embodiments may be implemented on different hardware devices, e.g. using a plurality of CPUs.

The foregoing description of the specific embodiments will so fully reveal the general nature of the embodiments herein that others may, by applying current knowledge, readily modify and/or adapt for various applications such specific embodiments without departing from the inventive concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of various specific embodiments, those skilled in the art will recognize that the embodiments herein may be practiced with modification within the spirit and scope of the embodiments as described herein.

What is claimed is:

1. A method comprising:
    detecting, by a relay User Equipment (UE), presence of at least one other relay UE providing Proximity Service (ProSe) to at least one remote UE, wherein the relay UE is operating in one of an announcing mode and a monitoring mode and the at least one other relay UE is operating in the announcing mode; and
    switching, by the relay UE, from the announcing mode to the monitoring mode or from the monitoring mode to the announcing mode, based on at least one of a number of the at least one other relay UE whose presence is detected, signal strengths of signals from the at least one other relay UE whose presence is detected, resource availability of the at least one other relay UE whose presence is detected, or a request from the at least one remote UE to render ProSe.

2. The method as claimed in claim 1, wherein the relay UE switches from the announcing mode to the monitoring mode in at least one situation, wherein the at least one situation comprises:
    the number of the at least one other relay UE is more than a first threshold,
    the signal strengths are greater than a signal strength threshold,
    the at least one other relay UE has resources to provide ProSe to the at least one remote UE, and/or
    an absence of the request from the at least one remote UE to receive ProSe.

3. The method as claimed in claim 1, wherein the relay UE switches from the monitoring mode to the announcing mode in at least one situation, wherein the at least one situation comprises:
    a number of the at least one other relay UE is less than a first threshold,
    the signal strengths are less than a signal strength threshold,
    the at least one other relay UE does not have resources to provide ProSe to the at least one remote UE, and/or
    a request is received from the at least one remote UE to receive ProSe.

4. The method as claimed in claim 1, wherein the relay UE is dynamically configured in the monitoring mode or the announcing mode when the relay UE is operating in one of Long Term Evolution (LTE) licensed band and Device-to-Device (D2D) unlicensed band.

5. The method as claimed in claim 1, further comprising negotiating among the relay UE and the at least one other relay UE for assigning the relay UE and the at least one other relay UE, to operate in one of the announcing mode and the monitoring mode, and a time period to operate in the one of the announcing mode and the monitoring mode.

6. The method as claimed in claim 5, wherein the negotiating comprises transmitting a negotiation message, wherein the negotiation message includes a type of ProSe, a preference indicator, a preference rank, and a random factor.

7. The method as claimed in claim 6, wherein the preference indicator indicates an intention to operate in one of the announcing mode and the monitoring mode.

8. The method as claimed in claim 6, wherein the preference rank indicates a preference value to operate in one of the announcing mode and the monitoring mode, and is based on a battery capability and specification, a resource capability, a protocol feature support, a dual connectivity, a carrier aggregation and a processing capability.

9. The method as claimed in claim 6, wherein a UE among multiple UEs having a same preference rank is assigned to provide ProSe in the announcing mode based on a random factor.

10. The method as claimed in claim 1, further comprising:
switching to the monitoring mode from the announcing mode in response to a request from the at least one remote UE to receive ProSe not being received;
operating in the monitoring mode for a first time period;
detecting a first absence of the at least one other relay UE providing ProSe;
switching to the announcing mode from the monitoring mode;
detecting a second absence of the at least one remote UE requesting to receive ProSe;
switching to the monitoring mode from the announcing mode; and
operating in the monitoring mode for a second time period, wherein the second time period is longer than the first time period.

11. The method as claimed in claim 1, wherein:
the relay UE is a Vehicle-to-everything (V2X) device,
the relay UE operates in one of the announcing mode and the monitoring mode based on a redundancy of a signal received from another V2X device,
the redundancy of the signal is determined based on a value of a hop count factor integrated in the signal and the signal strength of the signal, and
the value of the hop count factor is incremented when the signal is relayed.

12. The method as claimed in claim 11, wherein the relay UE device operates in the announcing mode if the signal is not redundant, and the relay UE device operates in the monitoring mode if the signal is redundant.

13. The method as claimed in claim 11, wherein the signal is redundant if the value of the hop count factor is greater than a hop count threshold and the signal strength of the signal is greater than the signal strength threshold.

14. The method as claimed in claim 13, wherein the signal is not redundant if the hop count factor is less than the hop count threshold.

15. A relay user equipment (UE) comprising at least one microprocessor configured to:
detect a presence of at least one other relay UE providing Proximity Service (ProSe) to at least one remote UE, wherein the relay user equipment is operating in one of an announcing mode and a monitoring mode and the at least one other relay UE is operating in the announcing mode; and
switch from the announcing mode to the monitoring mode or from the monitoring mode to the announcing mode, based on at least one of a number of the at least one other relay UE whose presence is detected, signal strengths of signals from the at least one other relay UE whose presence is detected, resource availability of the at least one other relay UE whose presence is detected, or a request from the at least one remote UE to render ProSe.

16. The relay UE as claimed in claim 15, wherein the at least one microprocessor is configured to switch from the announcing mode to the monitoring mode in at least one situation, wherein the at least one situation comprises:
the number of the at least one other relay UE is more than a first threshold,
the signal strengths are greater than a signal strength threshold,
the at least one other relay UE has resources to provide ProSe to the at least one remote UE, and/or
an absence of the requests from the at least one remote UE to receive ProSe.

17. The relay UE as claimed in claim 15, wherein the at least one microprocessor is configured to switch from the monitoring mode to the announcing mode in at least one situation, wherein the at least one situation comprises:
a number of the at least one other relay UE is less than a first threshold,
the signal strengths are less than a signal strength threshold,
the at least one other relay UE does not have resources to provide ProSe to the at least one remote UE, and/or
a request is received from the at least one remote UE to receive ProSe.

18. The relay UE as claimed in claim 17, wherein the at least one microprocessor is further configured to:
switch to the monitoring mode from the announcing mode in response to a request from the at least one remote UE to receive ProSe not being received;
operate in the monitoring mode for a first time period;
detect a first absence of the at least one other relay UE providing ProSe;
switch to the announcing mode from the monitoring mode;
detect a second absence of the at least one remote UE requesting to receive ProSe;
switch to the monitoring mode from the announcing mode; and
operate in the monitoring mode for a second time period, wherein the second time period is longer than the first time period.

19. The relay UE as claimed in claim 15, wherein the relay user equipment is dynamically configured in the monitoring mode or the announcing mode when the relay UE is operating in one of Long Term Evolution (LTE) licensed band and Device-to-Device (D2D) unlicensed band.

20. The relay UE as claimed in claim 15, wherein the at least one microprocessor is further configured to perform a negotiation with the at least one other relay UE, for assigning the relay user equipment and the at least one other relay UE to operate in one of the announcing mode and the monitoring mode, and a time period to operate in the one of the announcing mode and the monitoring mode.

21. The relay UE as claimed in claim 20, wherein the negotiation comprises transmitting a negotiation message, wherein the negotiation message includes a type of ProSe, a preference indicator, a preference rank, and a random factor.

22. The relay UE as claimed in claim 21, wherein the preference indicator indicates an intention to operate in one of the announcing mode and the monitoring mode.

23. The relay UE as claimed in claim 21, wherein the preference rank indicates a preference value to operate in one of the announcing mode and the monitoring mode, and is based on a battery capability and specification, a resource capability, a protocol feature support, a dual connectivity, a carrier aggregation and a processing capability.

24. The relay UE as claimed in claim 21, wherein a UE among multiple UEs having a same preference rank is assigned to provide ProSe in the announcing mode based on a random factor.

25. The relay UE as claimed in claim 15, wherein:
the relay user equipment is a Vehicle-to-everything (V2X) device,
the relay user equipment operates in one of the announcing mode and the monitoring mode based on a redundancy of a signal received from a V2X device,
the redundancy of the signal is determined based on a value of a hop count factor integrated in the signal and the signal strength of the signal, and
the value of the hop count factor is incremented when the signal is relayed.

26. The relay UE as claimed in claim 25, wherein the relay user equipment operates in the announcing mode if the signal is not redundant and the user equipment operates in the monitoring mode if the signal is redundant.

27. The relay UE as claimed in claim 25, wherein the signal is redundant if the value of the hop count factor is greater than a hop count threshold and the signal strength of the signal is greater than the signal strength threshold.

28. The relay UE as claimed in claim 27, wherein the signal is not redundant if the hop count factor is less than the threshold hop count.

29. A relay user equipment (UE) comprising at least one microprocessor configured to:
detect at least one other relay UE that is within a network area including the relay user equipment, that is in an announcing mode, and that is providing Proximity Service (ProSe) to at least one remote UE that is outside the network area; and
switch a mode of the relay user equipment from a monitoring mode to the announcing mode, or from the announcing mode to the monitoring mode, based on at least one of a number of the at least one other relay UE that is detected, signal strengths of signals of the at least one other relay UE that is detected, or resource availability of the at least one other relay UE that is detected.

30. The relay UE as claimed in claim 29, wherein the at least one microprocessor is configured to switch the mode based on a request from the at least one remote UE to render ProSe.

* * * * *